(12) United States Patent
Choi et al.

(10) Patent No.: US 8,202,033 B2
(45) Date of Patent: Jun. 19, 2012

(54) COWL CROSS MEMBER MOUNTING UNIT

(75) Inventors: Jun Hyuck Choi, Gyeonggi-Do (KR);
Jae Seob Choi, Gyeonggi-Do (KR); Phil Je Cho, Seoul (KR)

(73) Assignees: Hyundai Mobis Co., Ltd., Seoul (KR);
Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 323 days.

(21) Appl. No.: 12/626,266

(22) Filed: Nov. 25, 2009

(65) Prior Publication Data
US 2010/0303582 A1 Dec. 2, 2010

(30) Foreign Application Priority Data
Jun. 1, 2009 (KR) .................. 10-2009-0048227

(51) Int. Cl.
*F16B 43/00* (2006.01)
(52) U.S. Cl. ........................... 411/546; 411/535
(58) Field of Classification Search .................. 411/546, 411/535, 536
See application file for complete search history.

(56) References Cited

U.S. PATENT DOCUMENTS

| | | | |
|---|---|---|---|
| 4,682,906 A * | 7/1987 | Ruckert et al. | 403/409.1 |
| 5,288,191 A * | 2/1994 | Ruckert et al. | 411/432 |
| 6,357,953 B1 * | 3/2002 | Ballantyne | 403/43 |
| 6,543,956 B2 * | 4/2003 | Schwarzbich | 403/167 |
| 6,585,447 B2 * | 7/2003 | Schwarzbich | 403/374.3 |
| 6,666,615 B2 * | 12/2003 | Mukouyama et al. | 403/374.4 |
| 7,226,263 B2 * | 6/2007 | Schwarzbich | 411/546 |
| 7,891,927 B2 * | 2/2011 | Burger et al. | 411/546 |
| 8,066,465 B2 * | 11/2011 | Figge et al. | 411/546 |
| 2006/0280579 A1 * | 12/2006 | Seidl et al. | 411/546 |

FOREIGN PATENT DOCUMENTS

| | | |
|---|---|---|
| JP | 2005-325982 A | 11/2005 |
| JP | 2008-075870 A | 4/2008 |
| KR | 20-1999-0006428 U | 4/1999 |

* cited by examiner

*Primary Examiner* — Flemming Saether
(74) *Attorney, Agent, or Firm* — Edwards Wildman Palmer LLP

(57) ABSTRACT

The present invention features, in preferred aspects, a cowl cross member mounting unit that includes an adjustment bolt for suitably absorbing a tolerance occurring when a vehicle body panel and a cowl cross member are suitably coupled with each other, and a cap maintaining the coupling between the adjustment bolt and a fixing nut.

8 Claims, 7 Drawing Sheets

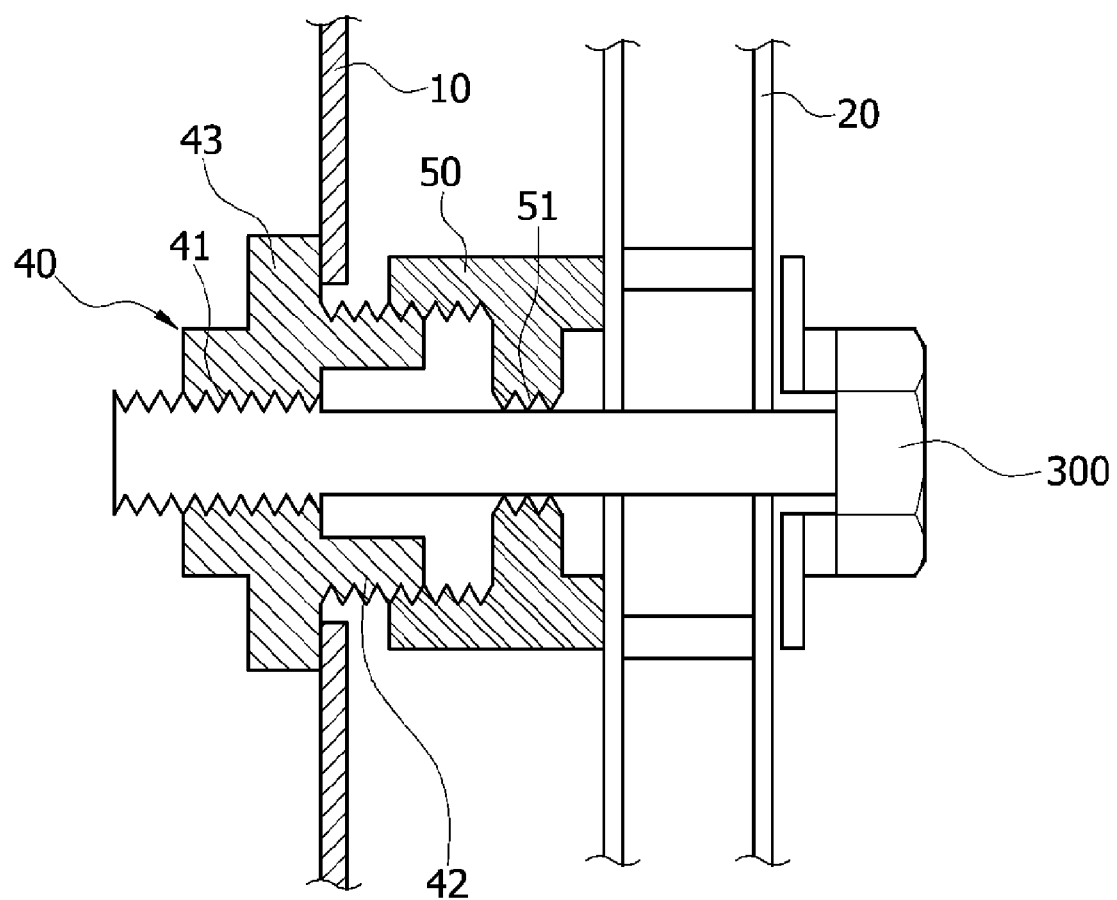

ically includes an adjustment bolt absorbing a tolerance occurring when a vehicle body panel and a cowl cross member are suitably coupled with each other and a cap maintaining the coupling between the adjustment bolt and a fixing nut.

COWL CROSS MEMBER MOUNTING UNIT

CROSS-REFERENCE TO RELATED APPLICATIONS

This application claims the benefit of Korean Patent Application No. 10-2009-0048227 filed on Jun. 1, 2009 in the Korean Intellectual Property Office, the disclosure of which is incorporated herein by reference in its entirety.

BACKGROUND

1. Technical Field

The present invention relates, generally, to a cowl cross member mounting unit and, more particularly, to a cowl cross member mounting unit, which preferably includes an adjustment bolt absorbing a tolerance occurring when a vehicle body panel and a cowl cross member are suitably coupled with each other and a cap maintaining the coupling between the adjustment bolt and a fixing nut.

2. Background Art

In general, a cowl cross member is a key part of a vehicle, which is fixedly mounted on either end of the bottom of a front pillar of a vehicle to suitably maintain torsional and flexural rigidity of the vehicle, and on which a steering wheel is mounted. Preferably, the cowl cross member is fixedly coupled to the front pillar using brackets disposed on opposite ends thereof.

Below, an exemplary cowl cross member mounting unit, that has been described in the art, is described with reference to the accompanying drawings.

FIGS. 1A and 1B are cross-sectional views each illustrating an exemplary cowl cross member mounting unit.

Referring to FIG. 1A, a bracket 10 is suitably coupled to one end of a cowl cross member (not shown), and first and second weld nuts 31 and 32 are suitably fixed to opposite ends of the bracket 10, respectively. Preferably, a bolt 300 is fitted into the nuts 31 and 32 to mount the cowl cross member (not shown) on a vehicle body panel 20. Accordingly, when the bolt 300 is rotated along the helix of threads in the first weld nut 31, an inner adjustment nut 33 screwed into the second weld nut 32 is driven to move towards the vehicle body panel 20 by a leaf spring 35 interference-fitted on a body of the bolt 300. At the same time, preferably, an outer adjustment nut 34 is suitably driven to move towards the vehicle body panel 20, thereby butting against the vehicle body panel 20.

Accordingly, as soon as the bolt 300 is screwed into the first weld nut 31, the inner adjustment nut 33 and the outer adjustment nut 34 are unscrewed to thereby absorb a tolerance between the vehicle body panel 20 and the cowl cross member bracket 10. However, this structure can be costly due to a large number of components. In addition, the central axes of the first weld nut 31 and the second weld nut 32 may not be suitably aligned with each other due to a deformation in welding since the first and second weld nuts 31 and 32 are preferably separately provided and respectively welded.

Referring to FIG. 1B, a weld nut 40 is suitably assembled to a bracket 10 coupled to one end of a cowl cross member (not shown). Preferably, the weld nut 40 includes inner threads 41, outer threads 42, and a flange 43. Preferably, an adjustment nut 50 is suitably coupled to the outer threads 42 of the weld nut 40 using a tool, and then is rotated in an unscrewing direction (i.e., a direction in which the adjustment nut 50 unscrews from the weld nut 40) until it butts against a vehicle body panel 20. Preferably, when the adjustment nut 50 is in tight contact with the vehicle body panel 20, a bolt 300 is rotated in one direction so that guide threads 51 of the adjustment nut 50 can screw into the inner threads 41 of the weld nut 40. As the bolt 300 is screwed into the weld nut 40, the cowl cross member is suitably coupled to the vehicle body panel 20 such that the adjustment nut 50 can absorb a tolerance between the cowl cross member and the vehicle body panel 20.

This structure can reduce cost due to a small number of components. However, this structure also requires that a tool for fastening the bolt 300 is replaced with the tool for fastening the adjustment nut 50, and, accordingly, operations of fastening the bolt 300 and absorbing the tolerance of the adjustment nut 50 are carried out respectively. Further, in the case of transporting the adjustment nut 50 and the weld nut 40, which are coupled with each other, the adjustment nut 50 and the weld nut 40 may be suitably decoupled from each other.

The information disclosed in this Background section is only for enhancement of understanding of the background of the invention and should not be taken as an acknowledgement or any form of suggestion that this information forms the prior art that is already known to a person skilled in the art.

SUMMARY OF THE INVENTION

The present invention preferably provides a cowl cross member mounting unit, which preferably includes an adjustment bolt and an insert-molded cap, in order to suitably maintain the coupling between the adjustment bolt and a fixing nut in the case of transporting the adjustment nut and the fixing nut, which are suitably coupled with each other.

Preferred embodiments of the present invention provide a cowl cross member mounting unit, in which an adjustment bolt and a bolt, both of which preferably screw into a fixing nut, are suitably formed to screw in opposite directions so that the adjustment bolt can be suitably rotated to unscrew from the fixing nut while the bolt is screwing into the fixing nut.

In an exemplary embodiment of the present invention, the cowl cross member mounting unit suitably fixes a cowl cross member to a vehicle body panel using a bracket mounted on either end of the cowl cross member. Preferably, the mounting unit may include, but may not be limited only to, a fixing nut, an adjustment nut, and a bolt. In certain preferred embodiments, the fixing nut is suitably fixed to the bracket, and includes a first thread portion suitably formed adjacent to the vehicle body panel and a second thread portion suitably formed adjacent to the bracket, the second thread portion preferably having a diameter smaller than that of the first thread portion, the fixing nut having a groove in an outer circumference of an upper part thereof. Preferably, the adjustment nut has a through-hole extending in an axial direction thereof, and suitably includes a body having threads formed on an outer circumference thereof and screwing into the first thread portion of the fixing nut and a head having a diameter larger than that of the body of the adjustment nut. Preferably, the bolt is fitted into the through-hole of the adjustment bolt and is suitably adapted to screw into the second thread portion. In certain preferred embodiments, the adjustment bolt and the bolt have threads formed in opposite directions to suitably screw into the fixing nut.

According to preferred exemplary embodiments of the cowl cross member mounting unit as described in accordance with the present invention, the adjustment bolt, the hooking protrusions of the insert-molded cap, and the groove of the fixing nut can cooperate to suitably maintain the coupling between the adjustment bolt and the fixing nut in the case of transporting the assembled structure.

According to preferred exemplary embodiments of the cowl cross member mounting unit as described in accordance with the present invention, the cowl cross member can be suitably coupled with the vehicle body panel by a simple manipulation using a small number of components since the bolt and the adjustment bolt are suitably formed with opposite screwing directions.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 1A and 1B are cross-sectional views each illustrating an exemplary cowl cross member mounting unit of the related art;

DETAILED DESCRIPTION

As described herein, the present invention includes a mounting unit for fixing a cowl cross member to a vehicle body panel comprising a fixing nut fixed to the bracket; an adjustment nut having a through-hole extending in an axial direction thereof; and a bolt fitted into the through-hole of the adjustment bolt and screwing into a second thread portion.

In one preferred embodiment, the fixing nut includes a first thread portion formed adjacent to the vehicle body panel and a second thread portion formed adjacent to the bracket.

In another preferred embodiment, the second thread portion has a diameter smaller than that of the first thread portion, and wherein the fixing nut comprises a groove in an outer circumference of an upper part thereof.

In a further preferred embodiment, the adjustment nut further comprises a body having threads formed on an outer circumference thereof and screwing into the first thread portion of the fixing nut.

In still another further embodiment, the head has a diameter larger than that of the body of the adjustment nut.

In another preferred embodiment, the adjustment nut and the bolt have threads formed in opposite directions to screw into the fixing nut.

In a further preferred embodiment, the mounting unit is used for fixing a cowl cross member to a vehicle body panel using a bracket mounted on either end of the cowl cross member.

Hereinafter, the present invention will be described more fully with reference to the accompanying drawings, in which an exemplary embodiment of a cowl cross member mounting unit is shown.

Figure 1A:
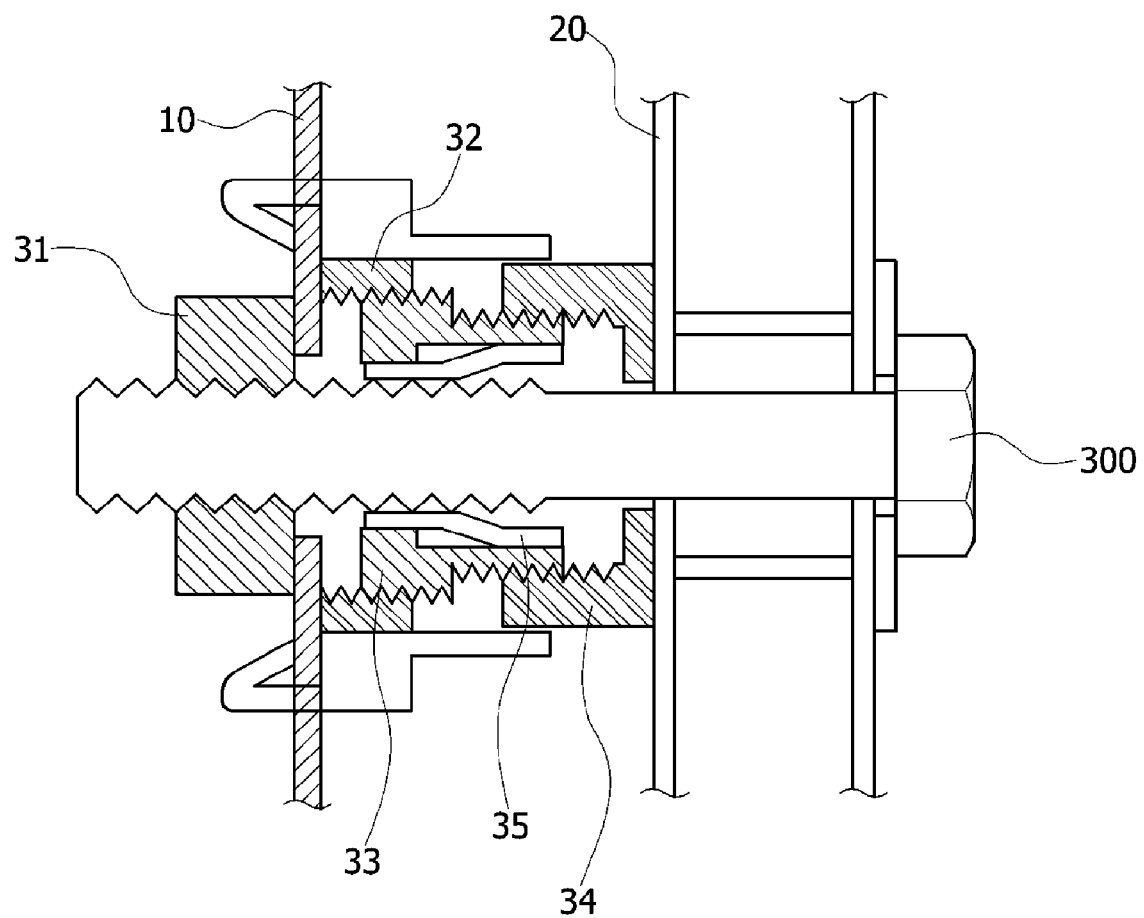
Figure 2:
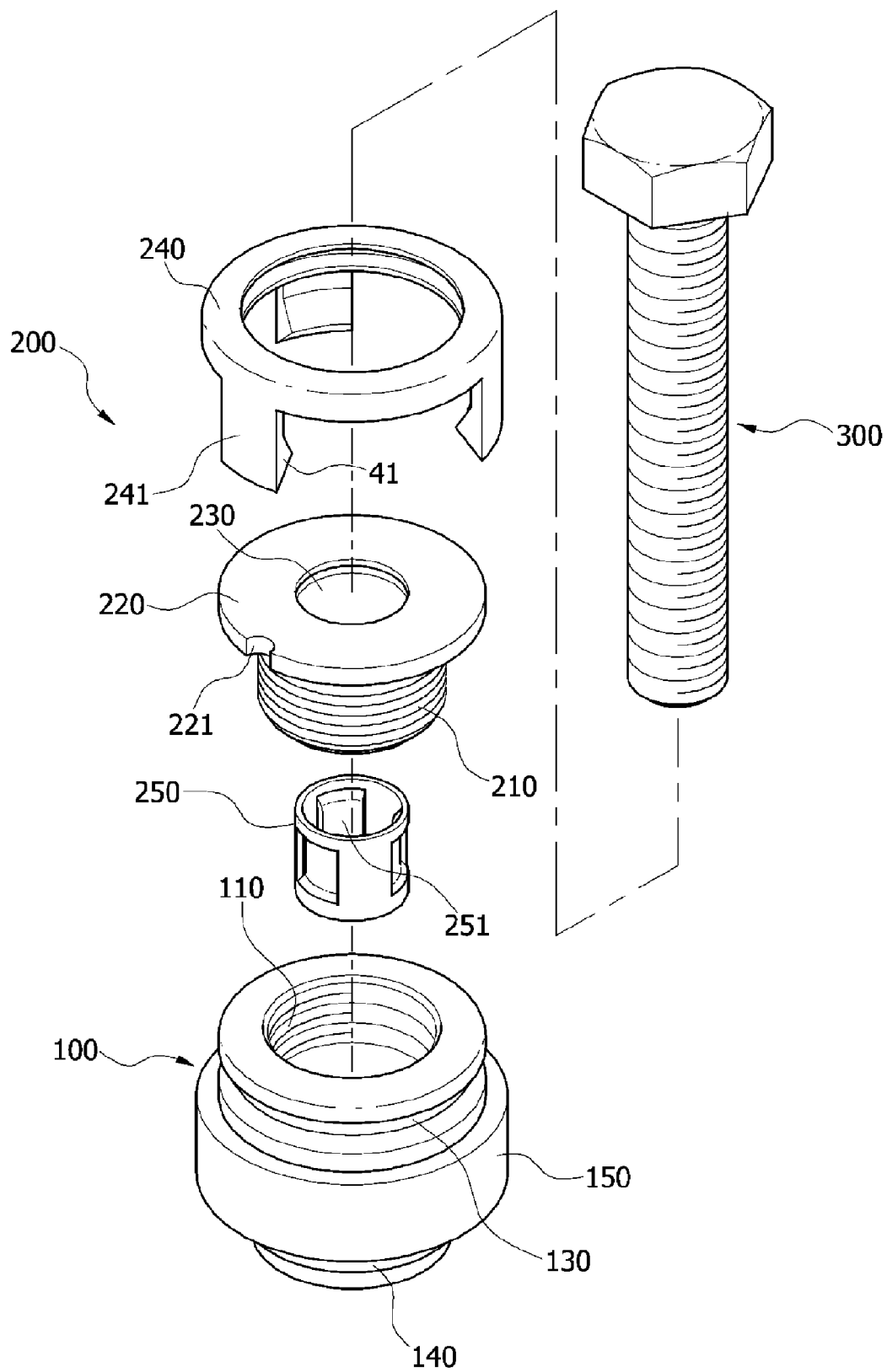
FIG. 2 is an exploded perspective view illustrating an exemplary cowl cross member mounting unit according to an exemplary embodiment of the present invention.
Figure 3A:
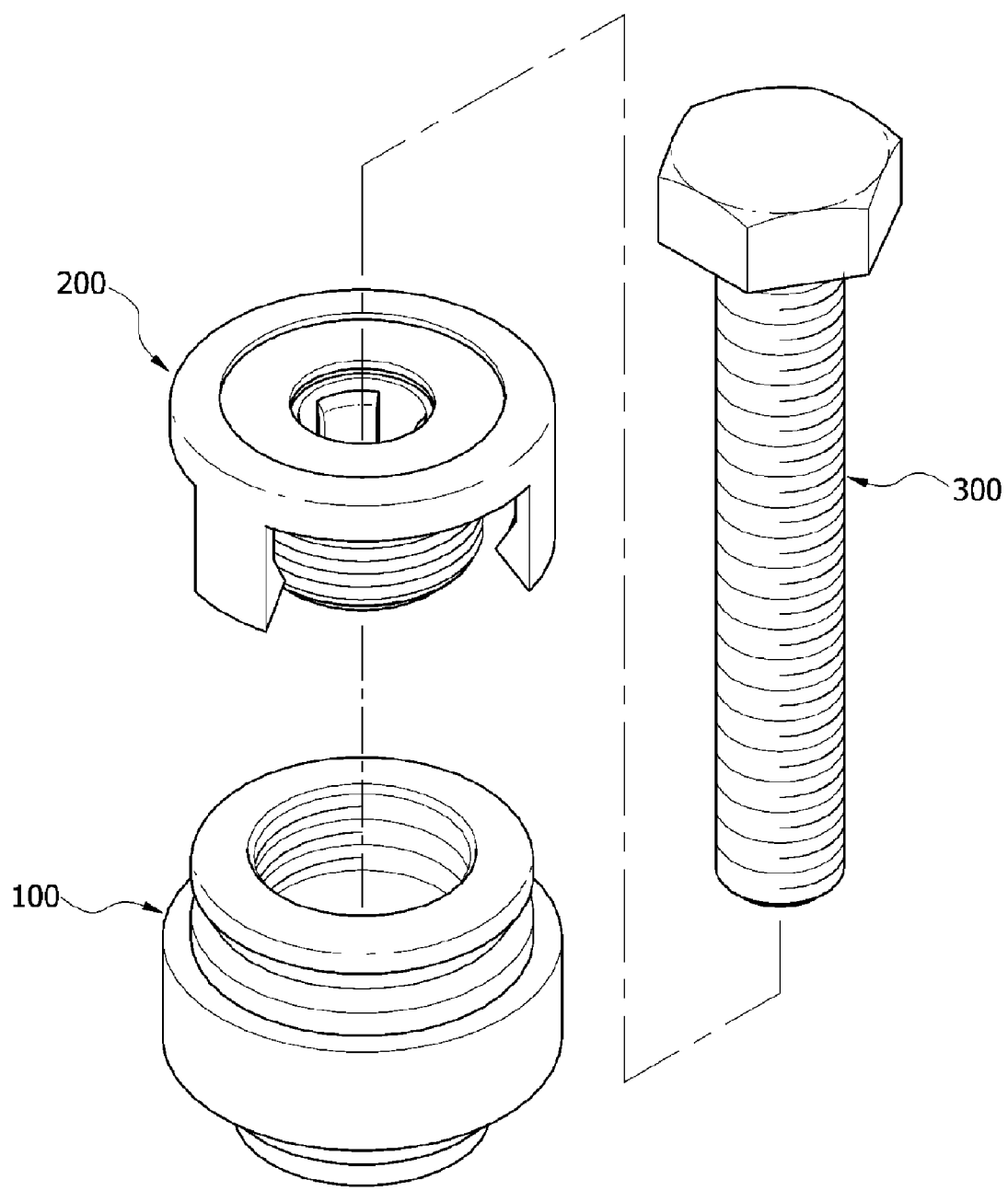
FIGS. 3A and 3B are perspective and cross-sectional views illustrating the cowl cross member mounting unit shown in FIG. 2.
Figure 3B:
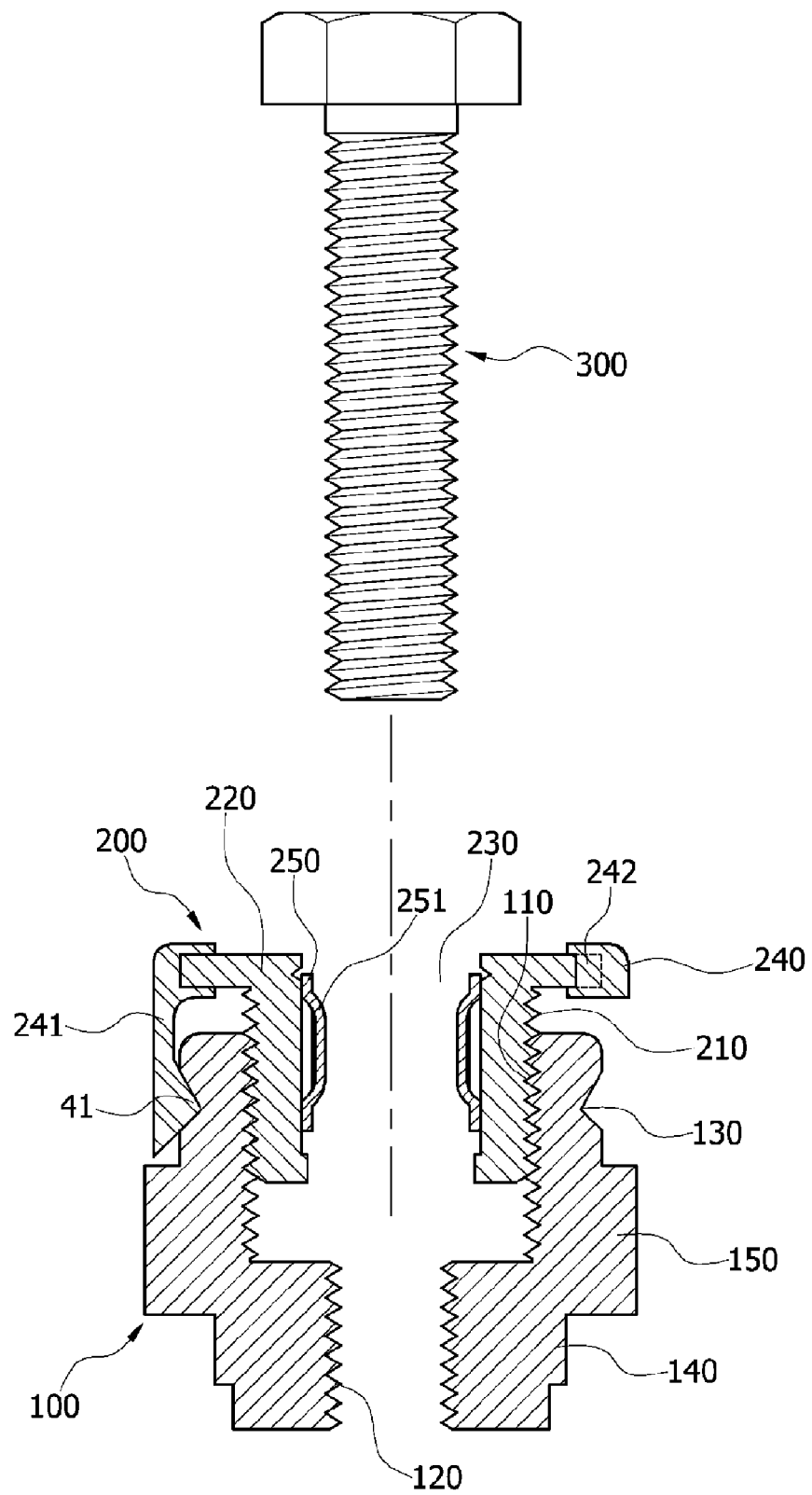
Figure 4:
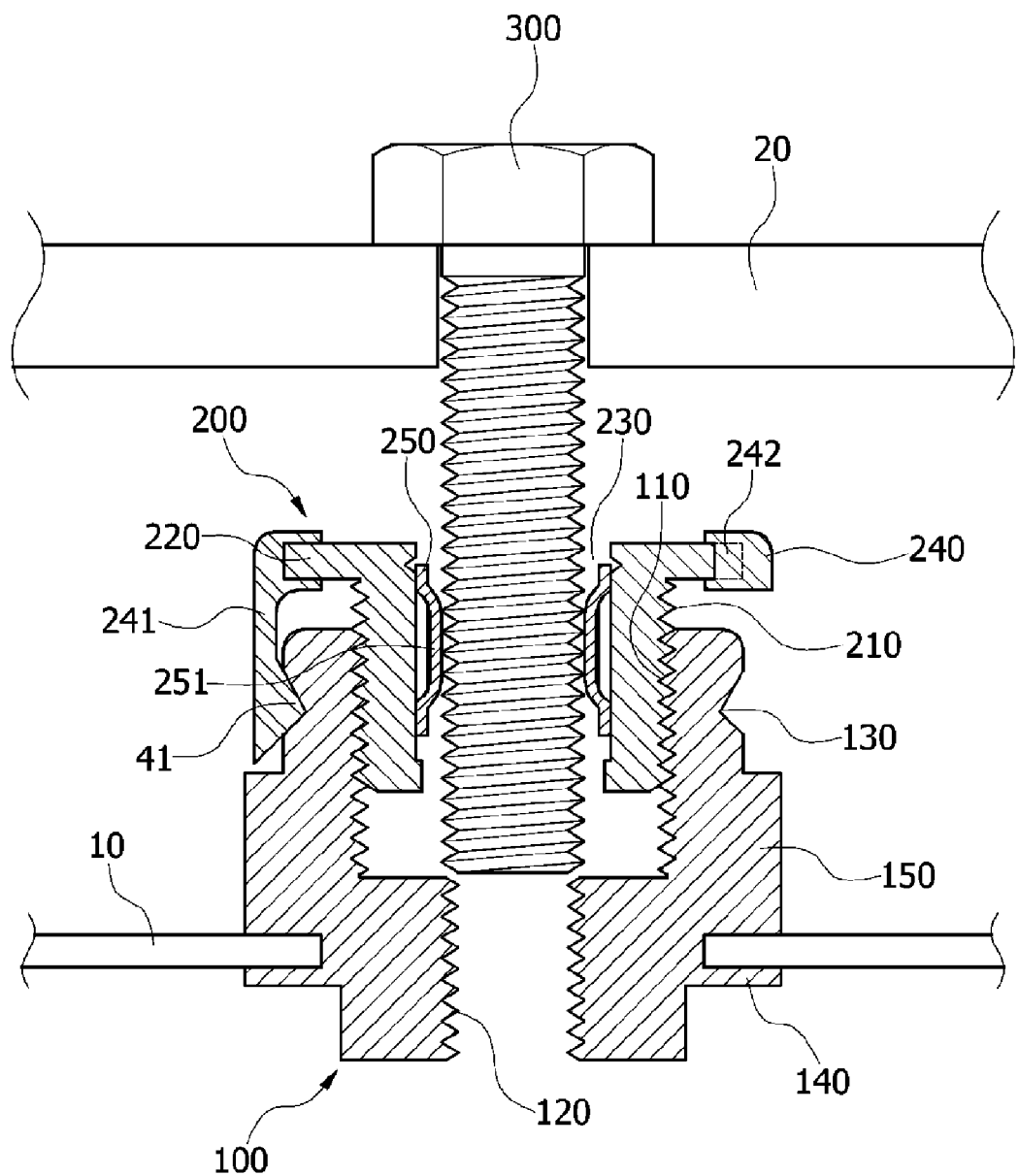
FIGS. 4 and 5 are cross-sectional views illustrating the cowl cross member mounting unit shown in FIG. 2, which is coupled with a vehicle body panel.
Figure 5:
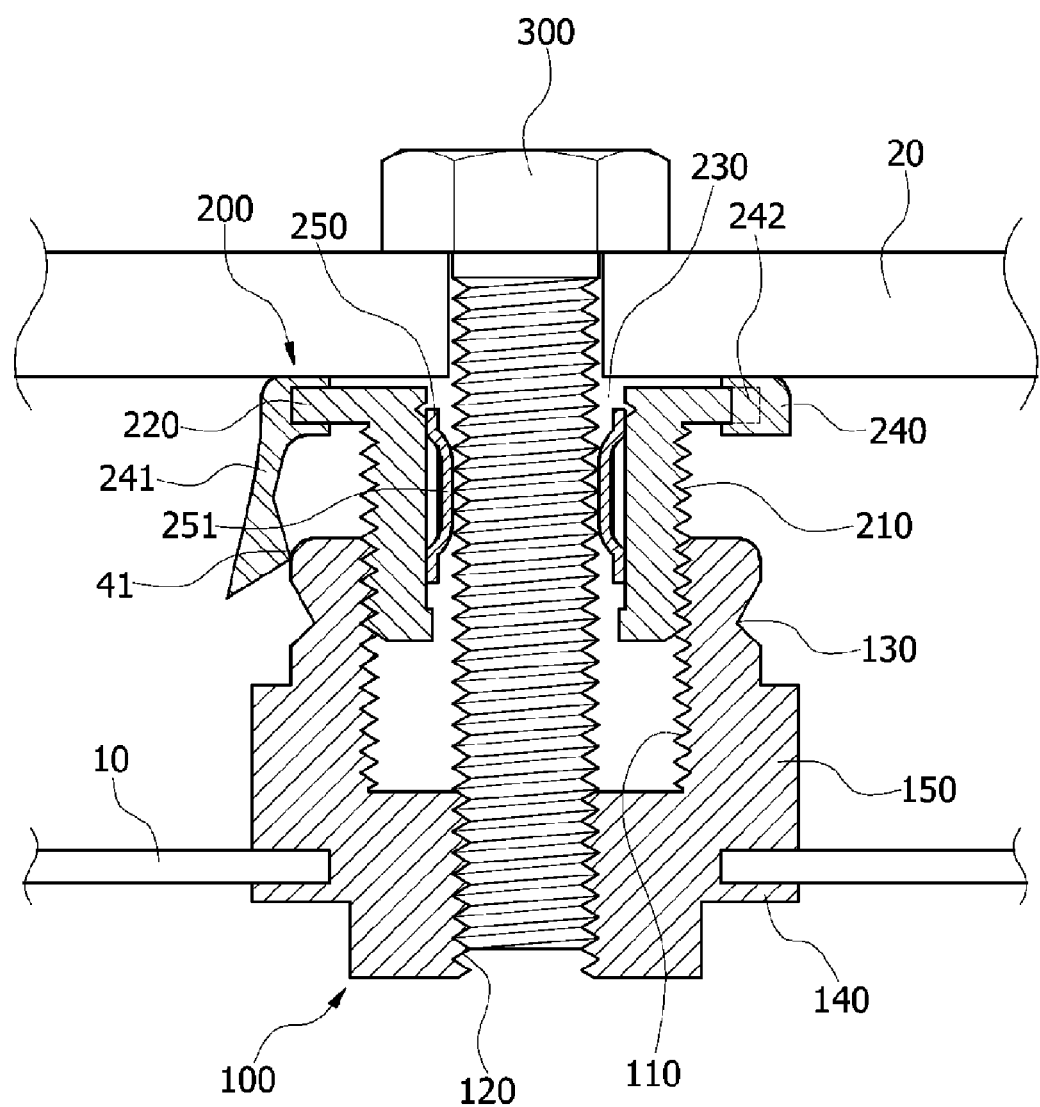

According to a preferred embodiment of the present invention, and as shown for example in FIG. 2, FIG. 2 is an exploded perspective view illustrating a cowl cross member mounting unit. In another further embodiment, and as shown in FIG. 3, FIGS. 3A and 3B are perspective and cross-sectional views illustrating the cowl cross member mounting unit shown in FIG. 2. In other exemplary embodiments, and as shown in FIGS. 4 and 5, FIGS. 4 and 5 are cross-sectional views illustrating an exemplary cowl cross member mounting unit shown, for example as shown in FIG. 2, which is suitably coupled with a vehicle body panel.

In certain preferred embodiments, preferably, the cowl cross member mounting unit is suitably used for coupling a cowl cross member (not shown) to a vehicle body panel 20. Preferably, the cowl cross member mounting unit is used to suitably mount the cowl cross member to the vehicle body panel 20 using a bracket 10 that is suitably disposed on one end of the cowl cross member.

Preferably, the cowl cross member mounting unit includes, but may not only be limited a fixing nut 100 that is suitably fixedly pressed to the bracket 10, an adjustment bolt 200 that is suitably screwed into the fixing nut 100, a bolt 300 that suitably extends through the adjustment bolt 200 and is suitably coupled with the fixing nut 100, and a cap 240 that is integrally bonded to the adjustment bolt 200 by insert molding.

According to certain preferred embodiments of the invention, the fixing nut 100 has threads on the inner circumference thereof, which is suitably divided into a first thread portion 110 and a second thread portion 120. Preferably, the diameter of the first thread portion 110 is larger than that of the second thread portion 120. Preferably, the fixing nut 100 has a groove 130 and a pressing portion 140. In further preferred embodiments, the groove 130 is formed along the outer circumference of the first thread portion 110. Preferably, the pressing portion 140 is suitably formed on the lower part of the fixing nut 100, along the outer circumference of the second thread portion 120. Preferably, the pressing portion 140 is suitably pressed while the fixing nut 100 is suitably fixed to the bracket 10. According to certain preferred embodiments of the present invention, fixing the fixing nut 100 to the bracket 10 by pressure can suitably minimize the risk of a deformation forming in the bracket 10 due to welding.

In further preferred embodiments, a flange 150 is suitably formed on the middle part of the fixing nut 100. Preferably, the flange 150 protrudes radially outwards from the outer circumference of the fixing nut 100, thereby seating on one side of the bracket 10. Accordingly, with this configuration, the flange 150 can preferably prevent the fixing nut 100 from being suitably displaced before the pressing portion 140 is suitably pressed against the bracket 10.

According to further preferred embodiments of the present invention, the adjustment bolt 200 has a body 210 and a head 220. Preferably, the body 210 has threads formed on the outer circumference thereof so as to screw into the first thread portion 110 of the fixing nut 100. In further preferred embodiments, the head 220 is suitably formed on top of the body 210, with a diameter that is suitably larger than that of the body 210. In addition, a through-hole 230, into which the bolt 300 can be suitably fitted, is formed along the central axis of the adjustment bolt 200.

In other preferred exemplary embodiments of the present invention, the through-hole 230 suitably serves to guide the bolt 300 to the second thread portion 120. Accordingly, with this configuration, the bolt 300 is suitably interference-fitted into the through-hole 230 such that the adjustment bolt 200 can suitably rotate together with the bolt 300 while the bolt 300 is being rotated to screw into the fixing nut 100. Preferably, the adjustment bolt 200 also includes a clip 250 fitted into the through-hole 230 to hold the bolt 300. In further preferred embodiments, the clip 250 has a hollow cylindrical configuration, with elastic strips 251 protruding inwards from the inner circumference of the clip 250. Preferably, the elastic strips 251 are suitably configured to generate an elastic force pushing the bolt 300 towards the central axis of the through-hole 230. As a result, the elastic force suitably holds the bolt 300, thereby maintaining the coupling between the bolt 300 and the adjustment bolt 200.

According to other certain embodiments of the present invention, when the adjustment bolt 200 is preferably brought into tight contact with the vehicle body panel 20 after the bolt 300 is screwed into the fixing nut 100, the elastic force of the strips 251 allows only the bolt 300 to rotate in an interference-fitted state.

Preferably, the cap 240 is also suitably disposed on the head 220 of the adjustment bolt 200, integrally bonded to the head 220 by insert molding. According to certain preferred embodiments, the cap 240 is made of a plastic material, and has elastic lugs 241, which preferably are circumferentially spaced from each other and extend away from the cap 240. Preferably, in a position where the cap 240 is suitably coupled with the head 220, the elastic lugs 241 extend towards the body 210. In other further embodiments, each of the elastic lugs 241 preferably has a hooking protrusion 41 on the distal end thereof, protruding towards the central axis of the adjustment bolt 200.

Preferably, the hooking protrusions 41 of the elastic lugs 241 are elastically fitted into the groove 130 in the outer circumference of the fixing nut 100 in the state where the adjustment bolt 200 is completely screwed into the fixing nut 100. According to further preferred embodiments, in this position, the hooking protrusions 41 can suitably prevent the adjustment bolt 200 from being rotated and unscrewing from the fixing nut 100 by an external vibration while being suitably transported.

In further preferred embodiments, while the elastic force of the elastic lugs 241 suitably prevents the adjustment bolt 200 from being rotated by an external vibration in the state where the hooking protrusions 41 are fitted into the groove 130, it allows the adjustment bolt 200 to suitably rotate when the bolt 300 is being screwed into the fixing nut 100. As a result, in other further embodiments, the hooking protrusions 41 are suitably separated from the groove 130 when the bolt 300 is being screwed into the fixing nut 100.

According to further preferred embodiments, at least one fixing recess 221 is suitably formed in the outer circumference of the head 220 of the adjustment bolt 200 in order to prevent the cap 240, where the cap is preferably integrally bonded to the head 220 of the adjustment bolt 200, from suitably rotating with respect to the head 220. In addition, preferably, a fixing protrusion 242 is suitably formed on the inner circumference of the camp 240, in a position corresponding to the fixing recess 221, so as to be suitably fitted into the fixing recess 221.

According to further preferred embodiments of the present invention, the bolt 300, after being suitably fitted into the through-hole 230 of the adjustment bolt 200, is screwed into the second thread portion 120 of the fixing nut 100, thereby suitably coupling the vehicle body panel 20 and the cowl cross member bracket 10. Preferably, the bolt 300 is then screwed into the threads in the lower inner circumference of the fixing nut 100.

In further preferred embodiments, the bolt 300 and the adjustment bolt 200, both of which are suitably screwed into the fixing nut 100, are threaded in opposite directions so that the rotating direction of the bolt 300 to screw into the fixing nut 100 is opposite to the rotating direction of the adjustment 200 to screw into the fixing nut 100. Preferably, in the state where the bolt 300 is suitably fitted and screwed into the adjustment bolt 200, if the bolt 300 is rotated in the screwing direction, the bolt 300 is driven forwards (i.e., downwards in FIG. 4) to screw into the fixing nut 100 but the adjustment bolt 200, screwed into the fixing nut 100, is driven backwards (i.e., upwards in FIG. 4) to unscrew from the fixing nut 100.

Accordingly, in other further embodiments, the adjustment bolt 200 can move to unscrew from the fixing nut 100 to thereby absorb a tolerance between the vehicle body panel and the bracket in response to a single operation of screwing the bolt 300 into the fixing nut 100.

Preferably, the coupling state between the bracket 10 and the vehicle body panel 20 are suitably described with reference to FIGS. 4 and 5. The fixing nut 100, into which the adjustment bolt 200 is preferably screwed, is fixedly coupled with the bracket 20 by pressing the pressing portion 140 to the bracket 10, with the end surface (i.e., the left end surface in FIG. 4) of the lower part of the fixing nut flange 150 contacting the bracket 10, which is coupled with one end of the cowl cross member (not shown).

Preferably, the bolt 300 is suitably fitted into the through-hole 230 of the adjustment bolt 200 through the vehicle body panel 20 in order to couple the bracket 10, to which the fixing nut 100 is fixed, with the vehicle body panel 20. Preferably, the bolt 300 fitted into the through-hole 230 is coupled with the adjustment bolt 200 by the elastic strips 251. Preferably, the adjustment bolt 200 is suitably rotated along with the bolt 300 as the bolt 300 is suitably rotated to screw into the second thread portion 120 of the fixing nut 100. Preferably, as soon as the bolt 300 is screwed into the fixing nut 100, the adjustment bolt 200 is rotated to unscrew from the fixing nut 100 so that the head 220 of the adjustment bolt 200 butts against the vehicle body panel 20.

In further preferred embodiments, since the force of the clip 250 holding the bolt 300 is suitably stronger than the elastic force of the elastic strips 241, the hooking protrusion 41 is detached from the groove 130, into which the hooking protrusion 41 has been fitted. Accordingly, in further preferred embodiments, the adjustment bolt 200 coupled with the bolt 300 can be easily screwed into and unscrewed from the fixing nut 100.

Preferably, after the head 220 of the adjustment bolt 200 is butted against the vehicle body panel 20, only the bolt 300 can be suitably rotated to screw into the fixing nut 100, and a space between the vehicle body panel 20 and the bracket 10 is suitably supported by the adjustment bolt 200, so that the cowl cross member (not shown) is tightly coupled to the vehicle body panel 20.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A mounting unit for fixing a cowl cross member to a vehicle body panel using a bracket mounted on either end of the cowl cross member, the mounting unit comprising:
   a fixing nut fixed to the bracket, wherein the fixing nut includes a first thread portion formed adjacent to the vehicle body panel and a second thread portion formed adjacent to the bracket, the second thread portion having a diameter smaller than that of the first thread portion, the fixing nut having a groove in an outer circumference of an upper part thereof;
   an adjustment bolt t having a through-hole extending in an axial direction thereof, wherein the adjustment bolt includes a body having threads formed on an outer circumference thereof and screwing into the first thread portion of the fixing nut and a head having a diameter larger than that of the body of the adjustment bolt;
   a bolt fitted into the through-hole of the adjustment bolt and screwing into the second thread portion; and
   a cap coupled with the head of the adjustment bolt and having an elastic lug, wherein the elastic lug has a hooking protrusion formed at a distal end thereof, protruding from the head towards the groove of the fixing nut, and elastically fitting into the groove,
   wherein the adjustment bolt and the bolt have threads formed in opposite directions to screw into the fixing nut.

2. The mounting unit in accordance with claim 1, wherein the bolt is interference-fitted into the through-hole of the adjustment bolt.

3. The mounting unit in accordance with claim 1, further comprising a clip disposed on an inner circumference of the through-hole, the clip having an elastic strip elastically supporting the bolt towards a central axis of the bolt.

4. The mounting unit in accordance with claim 1, wherein the head of the adjustment bolt has a fixing recess formed on an outer circumferential portion thereof and the cap has a fixing protrusion formed on an inner circumferential portion thereof, whereby the cap coupled with the head is prevented from rotating.

5. The mounting unit in accordance with claim 1, wherein a plurality of the elastic lugs are arranged along a circumference of the cap and are spaced from each other.

6. A mounting unit for fixing a cowl cross member to a vehicle body panel comprising:
   a fixing nut fixed to the bracket, wherein the fixing nut includes a first thread portion formed adjacent to the vehicle body panel and a second thread portion formed adjacent to the bracket;
   an adjustment bolt having a through-hole extending in an axial direction thereof, a body having threads formed on an outer circumference thereof and screwing into the first thread portion of the fixing nut, and a head having a diameter larger than that of the body of the adjustment bolt;
   a bolt fitted into the through-hole of the adjustment bolt and screwing into a second thread portion, wherein the second thread portion has a diameter smaller than that of the first thread portion, and wherein the fixing nut comprises a groove in an outer circumference of an upper part thereof; and
   a cap coupled with the head of the adjustment bolt and having an elastic lug, wherein the elastic lug has a hooking protrusion formed at a distal end thereof, protruding from the head towards the groove of the fixing nut, and elastically fitting into the groove.

7. The mounting unit of claim 6, wherein the adjustment bolt and the bolt have threads formed in opposite directions to screw into the fixing nut.

8. The mounting unit of claim 6, wherein the mounting unit is used for fixing a cowl cross member to a vehicle body panel using a bracket mounted on either end of the cowl cross member.

* * * * *